MOTION REPRODUCING MECHANISM

Filed April 21, 1943 6 Sheets-Sheet 1

INVENTOR
JAMES D. TEAR
Victor D. Borst
ATTORNEY

MOTION REPRODUCING MECHANISM

INVENTOR
JAMES D. TEAR
Victor D. Borst
ATTORNEY

Feb. 24, 1959 J. D. TEAR 2,874,542

MOTION REPRODUCING MECHANISM

Filed April 21, 1943 6 Sheets-Sheet 3

INVENTOR
JAMES D. TEAR
BY Victor D. Borst
ATTORNEY

Feb. 24, 1959 J. D. TEAR 2,874,542

MOTION REPRODUCING MECHANISM

Filed April 21, 1943 6 Sheets-Sheet 4

INVENTOR
JAMES D. TEAR
Victor D. Borst
ATTORNEY

Feb. 24, 1959 J. D. TEAR 2,874,542

MOTION REPRODUCING MECHANISM

Filed April 21, 1943 6 Sheets-Sheet 5

INVENTOR
JAMES D. TEAR
Victor D. Borst
ATTORNEY

Feb. 24, 1959 J. D. TEAR 2,874,542

MOTION REPRODUCING MECHANISM

Filed April 21, 1943 6 Sheets-Sheet 6

INVENTOR
JAMES D. TEAR
BY Victor D. Borst
ATTORNEY

United States Patent Office 2,874,542

Patented Feb. 24, 1959

2,874,542

MOTION REPRODUCING MECHANISM

James D. Tear, Great Neck, N. Y., assignor to Sperry Rand Corporation, a corporation of Delaware Application April 21, 1943, Serial No. 483,835

8 Claims. (Cl. 60—52)

The invention relates to follow-up mechanism in which the incoming or primary movement that is to be reproduced is used to control a servo motor that supplies the power to the driven or secondary member in which the primary movement is reproduced.

With mechanisms in which the incoming torque is small, it is essential in the interests of accuracy and sensitivity of following that there be no appreciable reaction from the relay control upon the instrumentality which is producing the primary movement, and it is the fundamental purpose of this invention to provide a relay control which will have such a property, one, for example, which will effect a reproduction of the movement of a gyroscope without causing undesirable reaction upon the gyroscope.

The invention is particularly applicable to hydraulic follow-up mechanism, that is, one in which the servo motor is a hydraulic motor the circuit of which is controlled by a valve structure that functions according to the difference between the incoming and response movements.

The invention resides primarily in the valve structure which is designed so that it constitutes the differential for comparing the incoming and response movements and thus eliminates the usual mechanical differential which imposes a load upon the primary motion producing instrumentality that is objectionable in some types of mechanism.

The valve has two principal elements one of which may be termed the pilot element that is rotated directly by the primary motion receiving member, and the other of which may be termed the response element that is rotated by the secondary member. This response element is caused to be translated by the relative angular movement of the two elements. This translation of the response element is initiated by rotation of the pilot element and is restored translatively by the response of the servo motor in compensating for and removing the relative angular movement of the two elements due to the incoming or primary movement.

The response element of the valve structure is a floating sleeve valve member arranged in control of the hydraulic servo motor so that in one axial position the control is in neutral and its direction of displacement from neutral position determines the direction of its control. Effectively the relation between the two valve elements is that of a screw and nut type differential so that the relative rotation of the two members feeds the one along. Specifically a type of hydraulic screw is preferred. As appears from the constructions selected for the purpose of illustration there is a constant hydraulic pressure on one end of the sleeve member which biases it in one direction, and a variable hydraulic pressure on the other end, the value of which is controlled by the coaction of a spiral groove on the pilot element that communicates with said other end and two ports in the sleeve member maintained under high and low hydraulic pressure, respectively.

The axial position of the sleeve member is a measure of the error and determines the rate of following and hence of the response, as well as its direction. This rate will desirably be controlled while synchronizing so that under a condition where the error is substantial, synchronism may be effected in a minimum of time consistent with accuracy and smoothness. To this end it is an object of this invention to embody in the control, means so to relate the speed of removal of the error to the value of the error that the acceleration during synchronism is constant or substantially so. This is done by so shaping the thread of the screw member, which in the illustrated constructions is the spiral groove of the pilot element, that it has a varying lead, becoming progressively less as the error increases. Specifically it is designed so that the speed of response or removal of the error is proportional to the square root of the error, following the principle disclosed in my copending application Serial No. 482,971, filed April 14, 1943, for Motion Reproducing Mechanism, now Patent No. 2,392,889, dated January 15, 1946.

The invention has other objects and advantages and comprehends other details of construction as will hereinafter more fully appear. I shall now describe the illustrated embodiments of the invention and shall thereafter point out the invention in claims.

Figure 2:
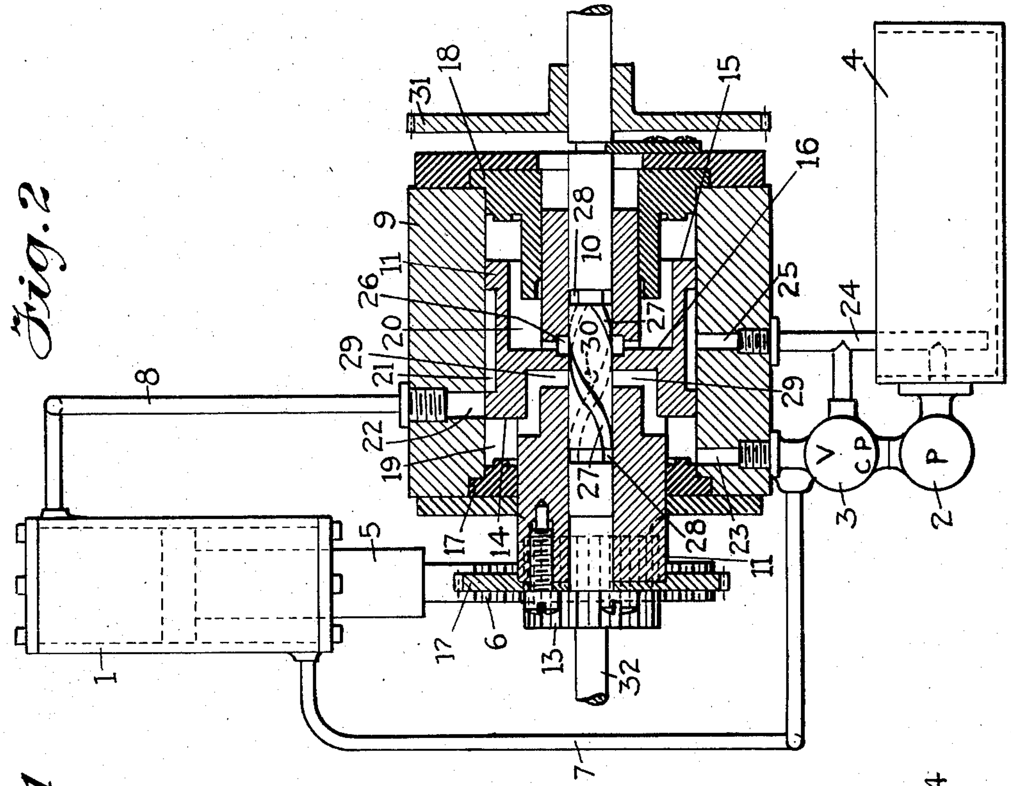
Fig. 2 is a sectional elevation of the same on line 2—2 of Fig. 1.
Figure 1:
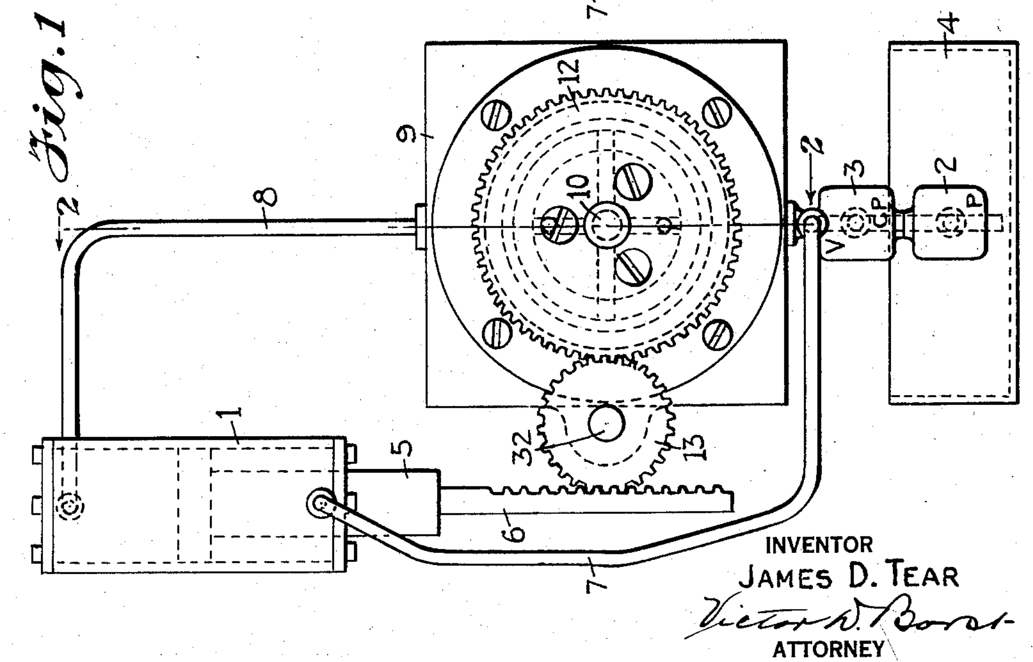
Fig. 1 is an end elevation of one form of mechanism embodying the invention.
Figure 4:
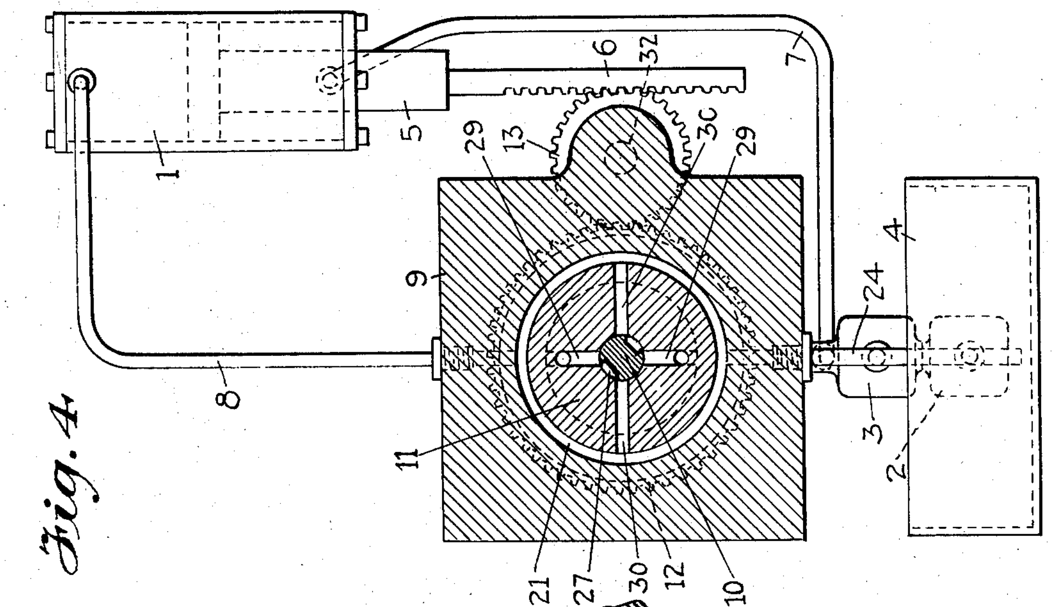
Fig. 4 is a sectional elevation on the line 4—4 of Fig. 3.
Figure 3:
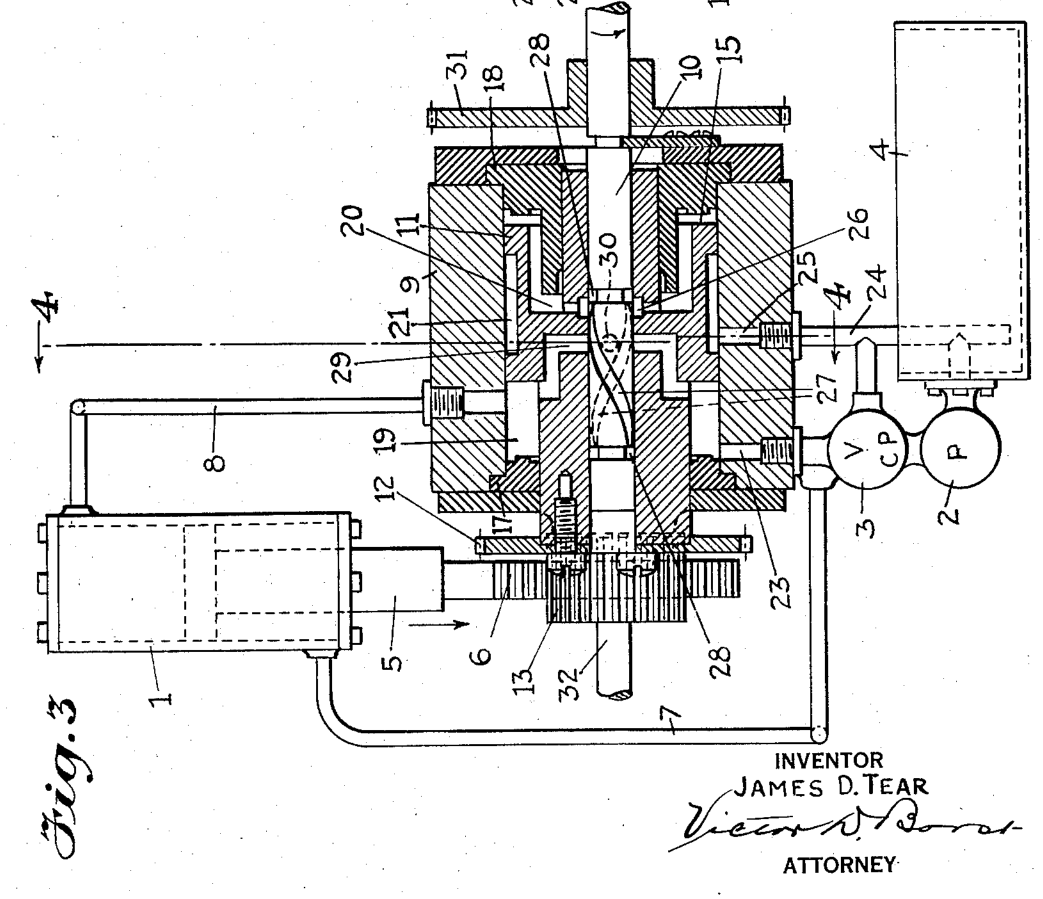
Fig. 3 is a view similar to Fig. 2 but showing the valve members in a different position.

In Figs. 1 to 4, inclusive, the servo motor 1 is shown as a hydraulic motor of the reciprocating piston type that operates under differential pressures, although it may be rotary and may be of any standard form. The hydraulic liquid is supplied at a constant pressure by a pump 2 through pressure regulating valve 3, and is exhausted to the pump well 4.

The piston 5 of the motor has an extension of reduced diameter on its lower side which extends through packing in the bottom of the cylinder and continues axially as an integral rack 6. The active area of the lower face of the piston is less than that of the upper face by the area of the reduced extension. Hydraulic liquid at constant pressure is delivered to the cylinder of the motor underneath the piston by conduit 7, and the space in the cylinder at the top of the piston is selectively connected through conduit 8 to the pressure and exhaust sides of the pump through the control valve which will now be described.

The valve members are contained in a valve casing 9 having a cylindrical cavity and closed ends. The valve members comprise a cylindrical pilot valve 10 and a surrounding sleeve valve 11 that fits on the pilot and in the casing. The pilot valve bears axially in the sleeve valve and extends through one end plate in which it is free to rotate but is restrained from axial movement. The sleeve valve 11 has an extension protruding through the opposite end plate of the casing on which is secured a gear 12 which is connected to the rack 6 by the intermediate idler gear 13. The idler gear is relatively wide so as to allow for lateral movement of the gear 12 as the sleeve valve is caused to move axially.

The sleeve valve 11 is shaped to provide pressure faces on its two ends of differential area. The extension that protrudes through the end plate and carries the gear 12 is reduced in diameter so as to provide a pressure face 14, and the opposite face is stepped due to an annular recess formed in the face so that the active pressure area includes the outer portion 15 and the inset portion 16. Bearing pieces 17 and 18 are attached to the respective end plates, and hydraulic chambers 19 and 20 are thus formed in the casing at the opposite ends of the sleeve valve. Also formed in the extreme peripheral area of the sleeve valve is a circumferential chamber 21 substantially symmetrically disposed between the end faces 14 and 15. The width of the annular face portion of the sleeve valve of full diameter between the end face 14 and the adjacent radial wall of the chamber 21 is substantially the diameter of the port 22 of the passage in the casing 9 with which the conduit 8 connects. Therefore the valve in the axial position shown in Fig. 2 laps the port 22 and is therefore in neutral position, while a movement to the right connects chamber 19 with conduit 8 and a movement to the left connects chamber 21 with conduit 8.

Chamber 19 is connected to the pressure side of the pump through passage 23 in the casing, and chamber 21 is connected to the exhaust side of the pump through conduit 24 and passage 25 in the casing. Chambers 19 and 21 are selectively connected to the end chamber 20 through conducting passages now to be described.

An internal circumferential groove 26 in the sleeve valve communicates through radial passages with the chamber 20. On the surface of the pilot valve 10 are two complementary spiral grooves 27 the ends of which connect into circumferential grooves 28. The spiral grooves are so disposed as to communicate with the groove 26 in all positions of the sleeve valve. Operationally, only one groove 27 is required, but two or more equally spaced grooves are desirable to balance the forces acting on valve 10.

Radial passages in the sleeve valve communicate with the pressure and exhaust chambers and terminate in ports on the inner face of the sleeve valve so positioned as to be caused selectively to register with the spiral grooves as the result of relative translational or angular movement of the two valve members. Radial passages 29 communicate with pressure chamber 19, and radial passages 30 communicate with exhaust chamber 21. The pressure and exhaust ports of the passages 29 and 30 are 90° apart at their centers and are of such diameter that they are spaced substantially the width of the spiral grooves 27. From the neutral position, therefore, a slight relative angular movement of the valve members in one direction connects chamber 20 to pressure and in the other direction connects the chamber to exhaust. The axial balance of the sleeve valve is thereby disturbed and axial movement results.

A typical operation will now be described. In the static or neutral condition the parts are as shown in Fig. 2. The gear 31 secured on the pilot valve 10 receives motion from some primary source such as a gyroscope or the receiver motor of a synchronous transmission system. This motion is to be reproduced in a driven shaft 32 that constitutes the follower member. The effect will be understood by reference to Figs. 5A to 8C.

Figures 5A, 5B, 5C, 6A, 6B, 6C, 7A, 7B, 7C, 8A, 8B, 8C:
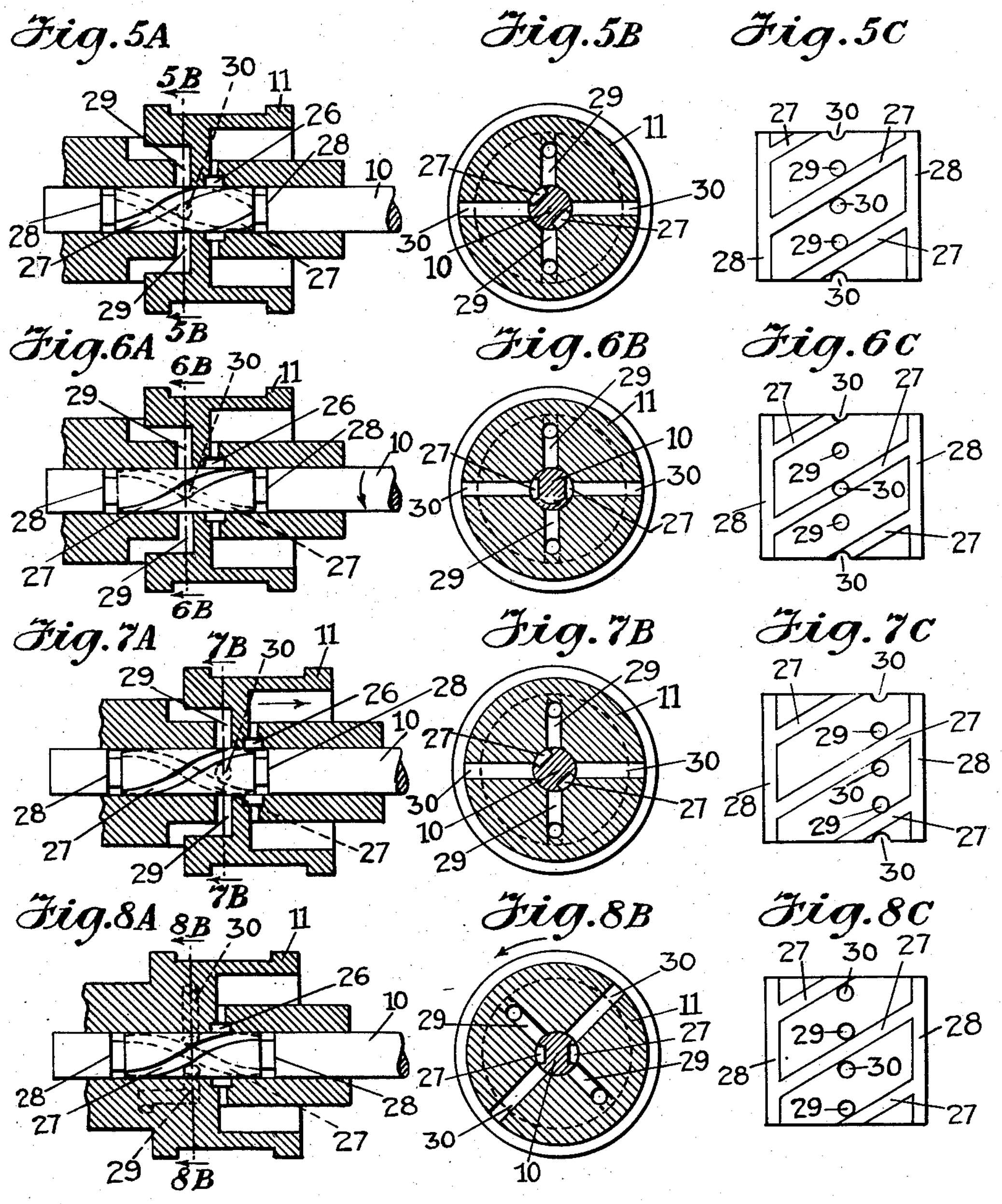
Fig. 5A is a fragmentary detail of the two coacting valve members as they appear in the sectional views and in the neutral position when the servo motor is at rest as in Fig. 2.
Fig. 5B is a transverse section of the same on line 5B—5B of Fig. 5A.
Fig. 5C is a diagrammatic view representing a development on a plane surface of the grooved portion of the cylindrical surface of the pilot valve member and the relative positions of the coacting pressure and exhaust ports in the sleeve valve member.
Figs. 6A, 6B and 6C are views corresponding to Figs. 5A, 5B and 5C, respectively, but showing the pilot valve member relatively angularly displaced.
Figs. 7A, 7B and 7C are respectively corresponding views showing the sleeve valve member axially displaced as a result of the relative angular displacement of the pilot valve member as in Fig. 3.
Figs. 8A, 8B and 8C are respectively corresponding views showing the sleeve valve member restored to its original axial position as a result of its rotational response action.

In Fig. 5A and the companion figures 5B and 5C the parts are shown in the neutral position. The grooves 27 just span ports 29 and 30 without communicating with them. The motor 1 is static.

In Fig. 6A and the companion figures 6B and 6C there is assumed to have been an incoming motion of the pilot valve in the direction of the arrow so as to bring the grooves 27 into register with the exhaust ports 30. This reduces the pressure in chamber 20 and the sleeve valve is caused to move to the right and admit pressure through port 22 to the motor 1.

Since the movement to the right of the sleeve valve uncovers the port 22 of conduit 8 to pressure, motor 1 is caused to move the rack 6 down. This action starts just as soon as the opening to the port is cracked. The downward movement of the rack rotates the sleeve valve in the same direction as the pilot valve is rotated. As the rotation of the sleeve valve continues at a rate determined by the opening of the port 22, the exhaust port 30 passes the groove 27 and the pressure port 29 is brought into registration therewith, thereby supplying fluid under pressure to the chamber 20 and forcing the sleeve valve to the left. This continues until the sleeve valve again closes the port 22 and interrupts the pressure on the line 8 to stop the motor 1.

In Figs. 6A, 6B and 6C the groove 27 is assumed to have just been brought into registration with the exhaust port 30, but no axial movement of the sleeve 11 has yet occured. In Figs. 7A, 7B and 7C the sleeve 11 is shown as shifted axially to the right, but no turning movement thereof has yet occurred. In Figs. 8A, 8B and 8C the sleeve 11 has been rotated and returned to its original axial position.

It is to be understood that these successive positions have been shown exaggerated for clarity. Actually the follow-up is so rapid that the sleeve 11 follows the rotation of the shaft 10 with only slight axial movement as the motor 1 begins to operate as soon as the port 22 is cracked either to pressure or exhaust.

Similarly, rotation of the shaft 10 in the opposite direction applies pressure to the chamber 20 to shift the sleeve 11 to the left and apply exhaust pressure to line 8. This causes the motor 1 to reverse and to rotate the sleeve 11 in the reverse direction until the chamber 20 has been connected to exhaust and the sleeve again shifted to its mid-position with the port 22 closed.

Figure 9:
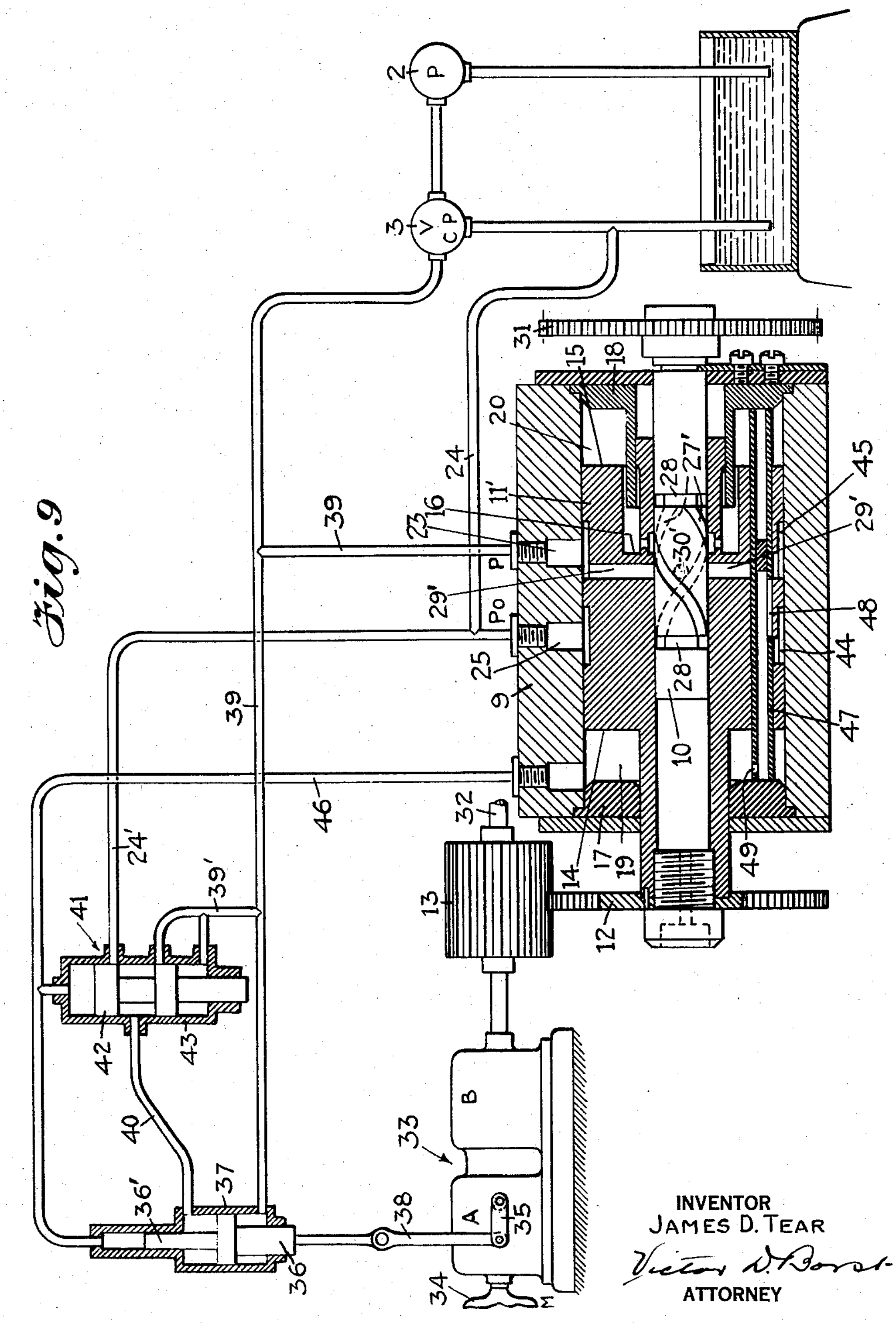
Fig. 9 is a view similar to Fig. 2 of a modified embodiment of the invention.
Figure 11:
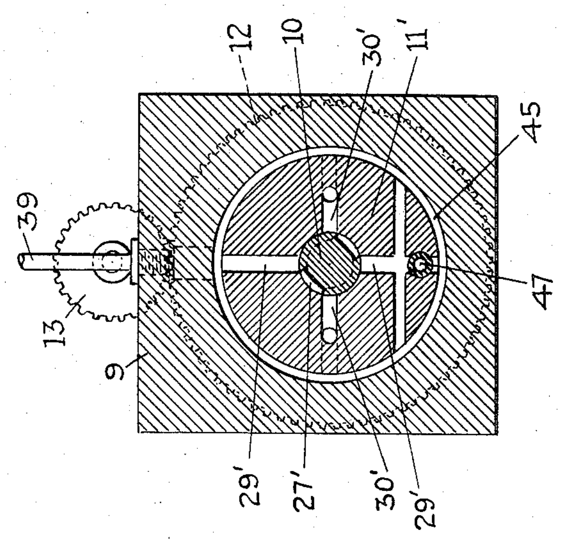
Fig. 11 is a transverse sectional elevation of the same on the line 11—11 of Fig. 10.
Figure 10:
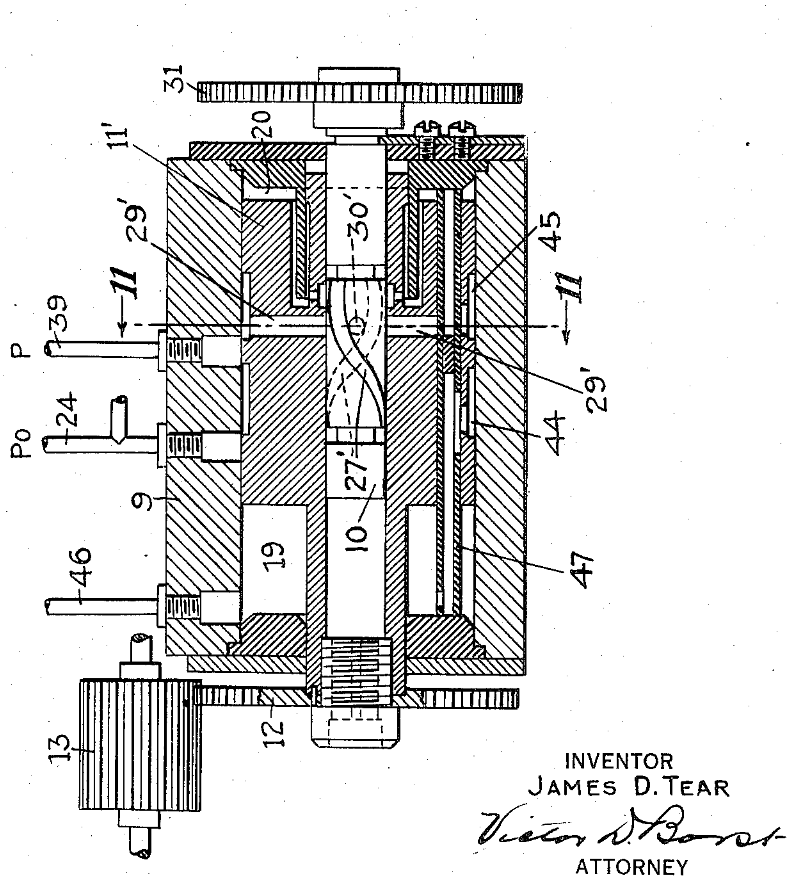
Fig. 10 is a similar view of the control valve and its immediately associated parts, showing the valve members in a different position.

In Figs. 9, 10 and 11 the invention is shown embodied with a different type of servo motor. In this case the motor is a variable speed, hydraulic gear 33 of well known form which includes a hydraulic pump, known as the "A" end and a hydraulic motor known as the "B" end which drives the follower shaft 32 on which is the wide pinion 13 that meshes with the response gear 12. The pump is rotated at constant speed by a motor 34, and the speed of the motor or "B" end is determined by the position of a tilting box or swash-plate in the "A" end actuated by a crank arm 35.

The crank arm 35 is positioned by a reciprocating hydraulic piston 36 that operates in a cylinder 37 after the manner of the piston 5 of motor 1. The bottom of the piston has a reduced extension that protrudes through the bottom of the cylinder and connects to the crank arm 35 by link 38. A high pressure conduit 39 connects the pressure side of the valve 3 to the interior of the cylinder 37 underneath the piston 36 and urges the piston up with a constant pressure. The interior of the cylinder 37 above the piston 36 is selectively connected to pressure and exhaust through pipe 40 by control means now to be described and including valve means with pilot and sleeve valve members similar to that previously described.

The connection of pipe 40 to pressure and exhaust is immediately controlled by a piston valve 41 termed the relay valve. A double ended piston 42 with a reduced central portion operates in cylinder 43 and has a reduced extension on its lower face which is guided by a bearing in the bottom end of the cylinder. A branch pipe 39′ from conduit 39 leads into the bottom part of the cylinder 43 and supplies fluid at constant pressure which gives the piston 42 a bias in the one direction. Opposing this is a variable pressure fluid, the pressure of which depends upon the axial disposition of the sleeve valve, as will presently be seen. Exhaust and pressure ports in the cylinder 43, spaced so as to be lapped by the piston 42 in its neutral position, are provided by branch pipes 24′ and 39′, respectively.

The sleeve valve of the main valve structure is similar in function to that of the first described form, but it is slightly different in physical structure and therefore is designated by the numeral 11′. This has two circumferential chambers 44 and 45, the former communicating with exhaust passage 25 in the valve casing that connects with conduit 24, and the latter with pressure passage 23 that connects with conduit 39. Radial passages 29′ connect pressure chamber 45 with two opposing interior ports, and radial passages 30′ connect the exhaust chamber 44 with two opposing interior ports 90° removed from but in the same plane as the pressure ports.

Grooves 27′ in the pilot valve 10 selectively connect ports 29′ and 30′ to the chamber 20. The chamber 19 at the opposite end of the sleeve valve is connected through conduit 46 with the interior of the relay valve cylinder 43 above the piston 42, and this closed hydraulic chamber is occupied by a confined body of hydraulic fluid that is termed the response volume. Through this response volume the axial movement of the sleeve valve produces an unbalance of the relay piston 42 and connects pipe 40 to pressure or exhaust. The piston 36 is thus moved to alter the speed of the motor 33.

It is necessary to stop the movement of piston 36 when the desired speed change is effected. The movement of the piston 36 must therefore restore the balance on the relay piston 42. This is done through a plunger 36′ on the piston 36 which constitutes a movable wall of the closed hydraulic chamber and compensates for the movement of the piston 42 so that the piston 42 may return to its neutral or off position leaving the piston 36 in its adjusted position. When the sleeve valve 11′ moves to the right due to the reduction in pressure in chamber 20, the volume of the chamber 19 is increased and liquid flows from the top of relay piston 42 through pipe 46 to the chamber 19, allowing the piston 42 to move up and connect the pipe 40 to exhaust pressure in the pipe 24′. The reduced pressure on the top of piston 36 allows this piston to rise and thereby adjust the variable speed transmission to speed up the rotation of the sleeve 11′. The piston 36′ rising in the chamber again displaces liquid into the chamber above the piston 42 and restores this piston to its mid-position. The net result is to cause the piston 36 to rise an amount proportional to the axial movement of the sleeve 11′. The transmission thus drives the sleeve 11′ at an increasing speed until the ports 30′ leave the grooves 27′ and cut off further exhaust from the chamber 20. The system thus is brought into balance with the sleeve 11′ exactly following the rotation of the shaft 10.

If the sleeve 11′ should overrun the shaft 10 and bring pressure ports 30′ into registration with the grooves 27′ pressure is applied to the chamber 20 to shift the sleeve 11′ to the left and the reverse action takes place to lower the piston 36 and slow down the drive of the sleeve 11′.

In the above system the movement of the piston 36′ is such that the volume of the chamber above the piston varies inversely as the volume of the chamber 19. Hence the position of the piston 36′, and the resulting speed of drive of the sleeve 11′ by the transmission 33, is a function of the axial position of the sleeve 11′. The axial displacement of the sleeve is thus proportional to the speed of rotation of the shaft 10, or to the rate of the incoming signal which drives the shaft 10. However, there is an angular displacement between the shaft 10 and the sleeve 11′ due to the pitch of the grooves 27′ and this angular displacement is proportional to the axial displacement of the sleeve from its mid-position. This angular displacement is known as the speed error because the axial displacement of the sleeve, and hence the angular displacement, is a function of the speed or rate of the input signal which is applied to the shaft 10.

If this speed error is objectionable the following supplemental means may be used to adjust the position of the speed element to eliminate the speed error and thus bring the sleeve into exact positional agreement with the shaft 10 as long as it is running at a constant speed. The supplemental means modify the response volume in chamber 19 in proportion to the axial displacement of the sleeve valve 11′. A tube 47 in the casing is carried by the sleeve valve parallel to the axis and is stationary with respect to the axial movement of the sleeve valve. A slot 48 in the tube is disposed so as to come into communication with either chamber 44 or 45 as the sleeve valve moves from its mid position. The tube has a restricted opening 49 communicating with the chamber 19. The flow through the opening 49 will be proportional to the displacement of the sleeve valve from its mid position.

This flow through the opening 49 reduces the liquid in the chamber above the piston 36′ and causes the latter to continue to rise and thereby to continue to increase the speed of drive of the sleeve 11′ by the transmission 33 until the sleeve 11′ finally overruns the shaft 10 and opens communications between the ports 29′ and the groove 27′ thus supplying pressure to the chamber 20 and shifting the sleeve 11′ to the left. This action continues until the sleeve 11′ reaches its mid-position and cuts off flow through port 48. The sleeve 11′ is thus brought back to its mid-position, but the transmission 33 has been adjusted to drive the sleeve 11′ at the rate of the shaft 10. Since the sleeve 11′ is in its mid-position the speed error has been removed and the sleeve and shaft are again in angular registration.

When the shaft 10 is turned to bring the grooves 27′ into registry with the pressure ports 29′ the sleeve 11′ is moved to the left and the same sequence of operations takes place in the reverse direction.

The spiral grooves of the form shown in Figs. 1 to 4, inclusive, have a uniform lead and hence on the development of Fig. 5C they appear as straight. With such grooves the positioning of the speed element during synchronizing and consequently the speed of the response will be in direct proportion to the error. It should be noted that during synchronization from an appreciable error the effect on the response volume of the flow through slot 48 is negligible as compared to the effect of axial movement of sleeve valve 11′. In order to effect synchronization in a minimum of time and at a constant predetermined acceleration best suited to the characteristics of the mechanism, it is desirable that the speed of the response be in proportion to the square root of the error. Preferably the spiral grooves 27 and 27' are so designed as to effect this result.

Figure 12:
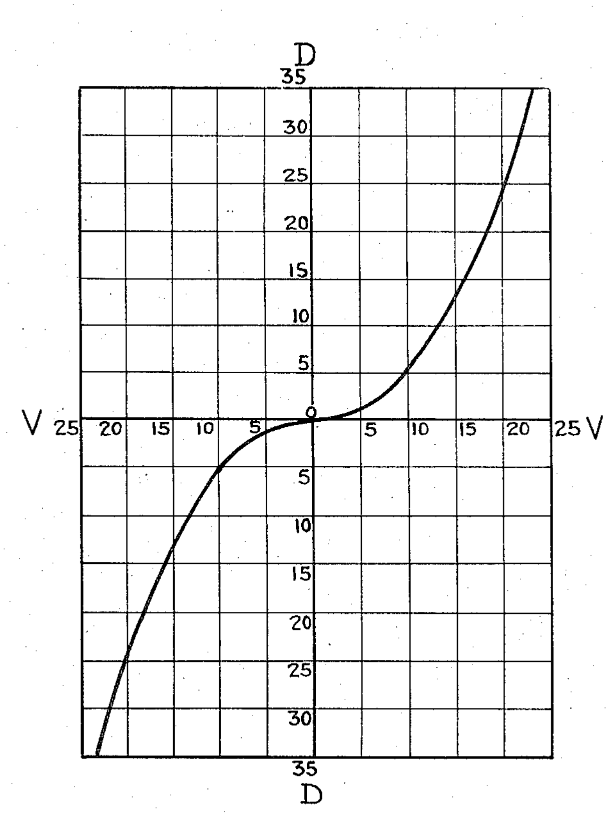
Fig. 12 is a graph showing an ideal curve representative of the ratio between the error and speed of removal of the error during synchronizing under a condition to effect constant acceleration.
Figure 13:
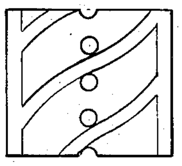
Fig. 13 is a development similar to Fig. 5C and showing the shape of the spiral grooves when designed according to the curve of Fig. 12.

The curve appearing in the graph of Fig. 12 is plotted according to the well known formula $V=\sqrt{2aD}$, where V is velocity, that is, the speed of the response or rate of removal of the error, D represents distance, that is the error and $a$ is the acceleration or deceleration, in this case having a predetermined constant value of eight. To effect that value as a constant acceleration or deceleration in bringing the follower into synchronism from a large positional disagreement, the grooves 27 and 27' will be of the shape of the curve of Fig. 12. A development on a plane surface of the grooved portion of a pilot valve so designed is shown in Fig. 13. With such a groove in pilot valve 10 the differential effect of relative angular movement between the sleeve valve and the pilot valve 10 will be variable, for example, when a large error exists and the sleeve valve is therefore displaced axially a large amount, the response must rotate the sleeve valve a relatively large amount to effect a given axial movement of the sleeve valve, but as the error becomes smaller the reduced slope of the groove requires a less amount of relative rotation between the sleeve valve and the pilot valve to effect the same given axial movement of the sleeve valve.

It is thought that the operation will be clearly understood from the above description. It will, however, be specifically described as applied to the form of the invention shown in Fig. 9, although it will be seen that it is equally applicable to the form shown in Fig. 2. An incoming movement turns the pilot valve 10. As shown in Fig. 10 this has been in a direction to move the sleeve valve to the right. This will cause the constant pressure on relay piston 42 to predominate and the valve will move up and connect pipe 40 to exhaust. The piston 36 will accordingly move up and adjust the speed control element of speed gear 33. The plunger 36' is also moved up and restores and balancing pressure on piston 42. The tube 47 is also connected to exhaust and there is a corresponding flow from chamber 19 until piston 36 takes up a position sufficient to keep the follower up with the incoming movement. The effect of the response on the rotation of the sleeve valve will therefore be just enough to keep its angular position in agreement with that of the pilot valve. If due to some abnormal condition there comes to be a substantial departure from positional agreement the speed of response during synchronizing will be proportional to the square root of the departure or error and because of the variable lead of the groove on the pilot valve the change of speed will be at the predetermined constant deceleration.

It is evident that instead of using the differential effect between the pilot valve and the sleeve valve that the sleeve valve may be secured against angular rotation and the pilot valve rotated relative thereto from the output of a differential, the inputs of which are the primary and secondary movements, for example, the position of a gyroscope and the output of the motor of the speed gear. With this construction the angular position of the pilot valve relative to the sleeve valve will represent the error and axial movement of the sleeve valve will control the power unit the same as in the construction illustrated.

It is obvious that other changes may be made in the constructions shown in the drawings and above particularly described within the principle and scope of the invention.

I claim:

1. Motion reproducing mechanism including a primary motion receiving member, a driven member, a hydraulic motor driving the driven member, a hydraulic circuit controlling the operation of the motor, a valve mechanism comprising a rotary pilot member operated by the primary motion receiving member, an axially movable and relatively rotatable sleeve valve on the pilot member having means responsive to its axial movement to control the hydraulic circuit, means controlled by relative rotary movement between the pilot member and the sleeve valve to effect axial movement of the sleeve valve, and response means operated by the motor and connected to produce a rotary movement of the sleeve valve to follow up the rotary movement of the pilot member.

2. In a hydraulic follow-up system, a valve mechanism comprising a casing, a cylindrical pilot valve mounted for rotation therein and having a spiral groove upon its surface, a sleeve valve relatively rotatable and axially movable on the pilot valve and having an internal circumferential groove communicating with the said spiral groove and with the space in the casing at one end of the sleeve valve and having two radial passages terminating in internal ports spaced substantially the width of the spiral groove, said ports being positioned to be selectively connected with the spiral groove upon relative motion between the valves, a source of high pressure and low pressure respectively connected with the two radial passages, means applying a force to the other end of the sleeve valve suited to cause axial movement of the sleeve valve responsive to changes in pressure in said space, and means responsive to axial movement of said sleeve valve to rotate said sleeve valve in a manner to follow up the movement of said pilot valve.

3. In a hydraulic follow-up system, a valve mechanism comprising a casing, a cylindrical pilot valve mounted for rotation therein and having a spiral groove upon its surface, a sleeve valve relatively rotatable and axially movable on the pilot valve and having an internal circumferential groove communicating with the said spiral groove and with the space in the casing at one end of the sleeve valve and having two radial passages terminating in internal ports spaced substantially the width of the spiral groove, said ports being positioned to be selectively connected with the spiral groove upon relative motion between the valves, a source of high pressure and low pressure respectively connected with the two radial passages, means applying a force to the other end of the sleeve valve suited to cause axial movement of the sleeve valve responsive to changes in pressure in said space, a hydraulic motor connected to rotate said sleeve valve, a hydraulic circuit controlling the operation of said motor, and means responsive to axial movement of said sleeve valve to control said hydraulic circuit to cause said sleeve valve to follow up the movement of said pilot valve.

4. In a hydraulic follow-up system, a valve mechanism comprising a casing, a cylindrical pilot valve mounted for rotation therein and having a spiral groove upon its surface, a sleeve valve relatively rotatable and axially movable on the pilot valve and having an internal circumferential groove communicating with the said spiral groove and with the space in the casing at one end of the sleeve valve and having two radial passages terminating in internal ports spaced substantially the width of the spiral groove, said ports being positioned to be selectively connected with the spiral groove upon relative motion between the valves, a source of high pressure and low pressure respectively connected with the two radial passages, means applying a force to the other end of the sleeve valve suited to cause axial movement of the sleeve valve responsive to changes in pressure in said space, a hydraulic motor connected to rotate said sleeve valve, a hydraulic circuit controlling the operation of said motor, and means responsive to axial movement of said sleeve valve to control said hydraulic circuit to cause said sleeve valve to follow up the movement of said pilot valve, said spiral groove having a pitch varying so that the axial movement of the sleeve valve is substantially proportional to the square root of the relative rotary movement of the pilot valve and the sleeve valve.

5. A hydraulic follow-up system comprising, in combination with a primary motion receiving member and a driven member, a hydraulic servo motor operatively connected to the driven member and including a movable part of differential area on opposing sides, a hydraulic pump, a conduit connecting the high pressure side of the pump with the lesser area side of the movable part of the motor, and means for selectively connecting the larger area side of the movable part to the high and low pressure side of the pump, said means comprising a valve casing having a port and a second conduit connecting said port with the said larger area side, a pilot valve rotatively mounted in the casing and operatively connected with the primary member and having a spiral groove on its surface, a sleeve valve having ends of larger and smaller areas respectively spaced to form with the casing intermediate pressure and high pressure end chambers, said sleeve valve being relatively rotatable and axially movable on the pilot valve and fitting in the casing and having an annular low pressure chamber in its periphery spaced from one end substantially the width of said port, a passage in the casing connecting the annular chamber to the low pressure side of the pump, another passage in the casing connecting the high pressure end chamber with the high pressure side of the pump, the sleeve valve having a circumferential internal groove communicating with the spiral groove and with the intermediate pressure end chamber and having two radial passages terminating in internal ports spaced substantially the width of the spiral groove and communicating one with the annular low pressure chamber and the other with the high pressure end chamber, the sleeve valve being adapted to connect said port alternately to the high and low pressure chambers and in an intermediate position to close the port; and means connecting the driven member to rotate the sleeve valve in a manner to follow up the rotation of the pilot valve.

6. A hydraulic follow-up system comprising, in combination with a primary motion receiving member and a driven member, a hydraulic servo motor of the variable speed type operatively connected to the driven member and including a speed regulating member, a cylinder and piston therein operatively connected to the speed regulating member and having differential areas on its opposite sides, a hydraulic pump, a conduit connecting the high pressure side of the pump with the lesser area side of the piston, and means for selectively connecting the larger area side of the piston to the high and low pressure side of the pump, said means comprising a piston valve having constant pressure means applied on one end urging the piston valve in one direction and a main control valve including a valve casing, a pilot valve rotatively mounted in the casing and operatively connected with the primary member and having a spiral groove on its surface, a sleeve valve relatively rotatable and axially movable on the pilot valve and fitting in the casing and having an internal circumferential groove communicating with the spiral groove and with the space in the casing at the adjacent end of the sleeve valve and having two external circumferential chambers and two radial passages terminating in internal ports spaced substantially the width of the spiral groove and leading one to each of the external chambers, conduits from the high and low pressure sides of the pump communicating through the valve casing with the respective external chambers, a conduit connecting the space in the valve casing at the opposite end of the sleeve valve with the other end of the piston valve and constituting with the said space a closed chamber filled with a hydraulic fluid which coacts with the constant pressure means to actuate the piston valve as the sleeve valve is axially displaced, and response means operatively coupling the output of the servo motor with the sleeve valve to rotate the sleeve valve in accordance with the movement of the said output.

7. Motion reproducing mechanism including a primary motion receiving member, a driven member, a hydraulic motor operative upon the driven member, a hydraulic circuit for controlling the operation of the motor, a valve mechanism comprising a rotary pilot member operated by the primary motion receiving member, an axially movable and relatively rotatable sleeve valve on the pilot member having means responsive to its axial movement to control the hydraulic circuit, means controlled by the relative rotary movement between the pilot member and sleeve valve to effect axial movement of the sleeve valve substantially proportional to the square root of the relative rotary movement, and response means operated by the power motor and having means to cause the sleeve valve to follow up the rotary movement of the pilot member.

8. A hydraulic follow-up system comprising, in combination with a primary motion receiving member and a driven member, a hydraulic servo motor of the variable speed type operatively connected to the driven member and including a speed regulating member, a cylinder and piston therein operatively connected to the speed regulating member and having differential areas on its opposite sides, a hydraulic pump, a conduit connecting the high pressure side of the pump with the lesser area side of the piston, and means for selectively connecting the larger area side of the piston to the high and low pressure side of the pump, said means comprising a piston valve having constant pressure means applied on one end urging the piston valve in one direction and a main control valve including a valve casing, a pilot valve rotatively mounted in the casing and operatively connected with the primary member and having a spiral groove on its surface, a sleeve valve relatively rotatable and axially movable on the pilot valve and fitting in the casing and having an internal circumferential groove communicating with the spiral groove and with the space in the casing at the adjacent end of the sleeve valve and having two external circumferential chambers and two radial passages terminating in internal ports spaced substantially the width of the spiral groove and leading one to each of the external chambers, conduits from the high and low pressure sides of the pump communicating through the valve casing with the respective external chambers, a conduit connecting the space in the valve casing at the opposite end of the sleeve valve with the other end of the piston valve and constituting with the said space a closed chamber filled with a hydraulic fluid which coacts with the constant pressure means to actuate the piston valve as the sleeve valve is axially displaced, and response means operatively coupling the output of the servo motor with the sleeve valve to rotate the sleeve valve in accordance with the movement of the said output, the spiral groove having a lead varying so that the axial movement of the sleeve valve is substantially proportional to the square root of the relative rotary movement between the pilot valve and the sleeve valve.

References Cited in the file of this patent

UNITED STATES PATENTS

| | | |
|---|---|---|
| 2,114,005 | Tyler | Apr. 12, 1938 |
| 2,171,005 | McNeil et al. | Aug. 29, 1939 |
| 2,189,823 | Vickers et al. | Feb. 13, 1940 |
| 2,243,603 | McMillin et al. | May 27, 1941 |
| 2,244,296 | Heinrich et al. | June 3, 1941 |
| 2,263,315 | Rose | Nov. 18, 1941 |

FOREIGN PATENTS

| | | |
|---|---|---|
| 464,891 | Great Britain | Apr. 27, 1937 |